US007581189B2

(12) United States Patent
Woodall et al.

(10) Patent No.: US 7,581,189 B2
(45) Date of Patent: Aug. 25, 2009

(54) DYNAMICALLY GENERATING A DATABASE REPORT DURING A REPORT BUILDING PROCESS

(75) Inventors: Zachary P. Woodall, Issaquah, WA (US); Abigail E. Short, Redmond, WA (US); Brian S. Ruble, Bellevue, WA (US); Clinton D. Covington, Kirkland, WA (US); Kumar Srinivasamurthy, Redmond, WA (US); Pavel R. Karimov, Redmond, WA (US); Stephen I. Lesser, Redmond, WA (US); Tosh Kawai, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 272 days.

(21) Appl. No.: 11/344,509

(22) Filed: Jan. 31, 2006

(65) Prior Publication Data

US 2007/0067711 A1 Mar. 22, 2007

Related U.S. Application Data

(60) Provisional application No. 60/715,887, filed on Sep. 9, 2005.

(51) Int. Cl.
*G06F 3/00* (2006.01)
(52) U.S. Cl. .................................... 715/762
(58) Field of Classification Search ................. 715/762
See application file for complete search history.

(56) References Cited

U.S. PATENT DOCUMENTS

2007/0061742 A1* 3/2007 Brooks et al. ............... 715/763

FOREIGN PATENT DOCUMENTS

| KR | 1996-0011754 | 4/1996 |
|----|--------------|--------|
| KR | 2000-0047631 | 7/2000 |
| KR | 2002-0041033 | 6/2002 |
| KR | 2002-0063967 | 8/2002 |

OTHER PUBLICATIONS

Dr. Excel, "Tips and Tricks," May 8, 1999, www.drexcel.com/tips/tip019.htm.*
Joe Kraynak, "Absolute Beginner's Guide to Microsoft Office Excel 2003," Sep. 11, 2003, Que.*

* cited by examiner

*Primary Examiner*—William L Bashore
*Assistant Examiner*—Daniel Um
(74) *Attorney, Agent, or Firm*—Merchant & Gould; Ryan T. Grace (57) ABSTRACT

A browse mode designer allows an average user of a database application program to easily design reports. The user can use the browse mode designer to build meaningful reports that aggregate data and that combine related data into shaped patterns for easier consumption of information. The browse mode designer can interpret a user's actions and extrapolate what actions are to be performed. A user interface can be used to let the user change the resulting views while being designed.

20 Claims, 12 Drawing Sheets

DYNAMICALLY GENERATING A DATABASE REPORT DURING A REPORT BUILDING PROCESS

RELATED APPLICATIONS

The present application claims the benefit under 35 United States Code § 119(e) of United States Provisional Patent Application No. 60/715,887, filed Sep. 9, 2005, which is incorporated by reference.

BACKGROUND

Users having different levels of ability often create reports by using database applications that have a database engine. The users create forms to enter and edit database information, and once a form is created, it is often difficult to change or modify the form in a way that is intuitive for users and is easy to use. A schema is typically used to define a form, and schema modification options and/or dialog boxes for changing the schema of the form are often very closely dependent upon database applications. The database applications often require a high level of skill and core knowledge of database concepts in order to manipulate the database application. Thus, users who are not familiar with formal database theory, or who do not have experience in database design, often need help in retrieving and organizing data types and other features based on their input data.

Form design tools often force the user to design the form as a preliminary step to creating the view on data (formatted report or form) that they want. This preliminary step is not intuitive for most users and creates extra work for the user. Conventional query tools use "designer" and "wizard" paradigms for creating forms. In abstract "designers", the user is separated from their data and has a diminished sense of the result. Wizards are tools that can be used to step users through the process of creating a new form, which often provide a one-shot chance at getting the query elements they want. (Wizards also have data-centered viewpoints, and typically only provide formatting afterwards.) However, wizards often provide results that can be even more removed from the anticipated forms than the users would get from a designer.

Additionally, conventional database applications are used as a reporting tool. Besides demanding some higher level of experience with the application, reporting tools often require users to go through a multistep process in order to produce satisfactory reports. Users typically retrieve data from many different data sources, which may or may not have relational information. The users then take that information and combine it into a single report for display in print or on screen. Traditionally, it has been difficult to easily build a report, especially a report that is attractive, informative, and easy to use.

This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to one aspect, user commands are received to position a first field on a display surface and to position a second field on the display surface, using the relative location of the second field position to the first field position to determine a logical relationship between the first and second fields. A query is generated to produce a results set from the first and second fields in accordance with the determined logical relationship. The results set is displayed in accordance with the first field position and the second field position.

According to another aspect, a display is used to position a first field and a second field on a display surface, using the relative location of the second field position and the first field position to determine a logical relationship between the first and second fields. A query generator creates a query for producing a results set from the first and second fields in accordance with the determined logical relationship and displays the results set in accordance with the first field position and the second field position.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer-implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Data is typically stored on computer systems in an organized fashion, which allows the data to be sorted, manipulated, and displayed in response to a user's commands. Such data can be stored using database systems, which provide commands for users to manipulate the data. Additionally, schema can be used to define how data is to be stored and accessed. In the recent past, directly coding schema and manipulating database information required knowledge of programming languages, which typical users do not possess, and which can be inefficient for those who do possess such knowledge. Database designers can also be used, but restrict the ability to access data and database structures at the same time.

Traditionally, one of the hardest hurdles for users of database application programs to overcome has been the schism between the runtime and design experience for forms and reports. Browse mode is typically the runtime mode for objects in an Microsoft Office® Access® database. While in browse mode, controls (such as textboxes and labels) in forms and reports are databound —that is, they display data from tables in the database in the format determined by the design of the form. Browse mode is also usually the default mode in which an object is opened. A "view" is an object in the database which can be used to visually interact with or view data stored in tables (e.g., reports, forms, queries, and the like).

In various embodiments, a browse mode designer is an easy-to-use form- and report-building interface. The browse mode designer allows an average user of a database application program to easily design forms and reports. Users can employ it to build meaningful reports that aggregate data and that combine related data into shaped patterns for easier consumption of information. The browse mode designer not only includes the system for combining information from various data sources, but also allows an individual to call desired data from tables by letting the users combine selected information from off a display surface.

The browse mode designer can interpret a user's actions and extrapolate what actions are to be performed. The extrapolated action modifies underlying source files and/or templates (based upon examination of other reports to determine what most report builders expect and similar heuristics, such as "do not duplicate repeated items in fields when performing pivot functions") such that information is displayed in a way the user would likely expect the data to be presented. A user interface not part of the actual report is also displayed to let the user change the resulting views.

The browse mode designer also allows the user to make certain choices with respect to how the combined information should be laid out. The browse mode designer allows users to see the data while making changes to the view. The browse mode designer can automatically resize entire rows and columns of data in addition to being able to automatically reorder data (relative to other fields) and resize fields (based on the length of data to be displayed, for example). The user can also visually format the data (e.g., bolding, italicizing, underlining, and the like) and adjust the placement location(s) of their data in the view.

For example, a user desires to construct a report about employees where "employee" is the unit, and has associated information such as first name, last name, and phone number (that are attributes of the unit "employee"). The browse mode designer allows users to construct a report on all employees, including whichever attributes they choose, while viewing the actual current report at all times during construction. The browse mode designer also makes the attributes (in the form of fields) to be aware of each other and position themselves appropriately on the reporting surface. When adding fields to the report, for example, the field "first name" would not overlap the field "last name." Also, the field "phone number" could be inserted later, between "first name" and "last name," and those fields would part to make room for the added field.

Figure 1:
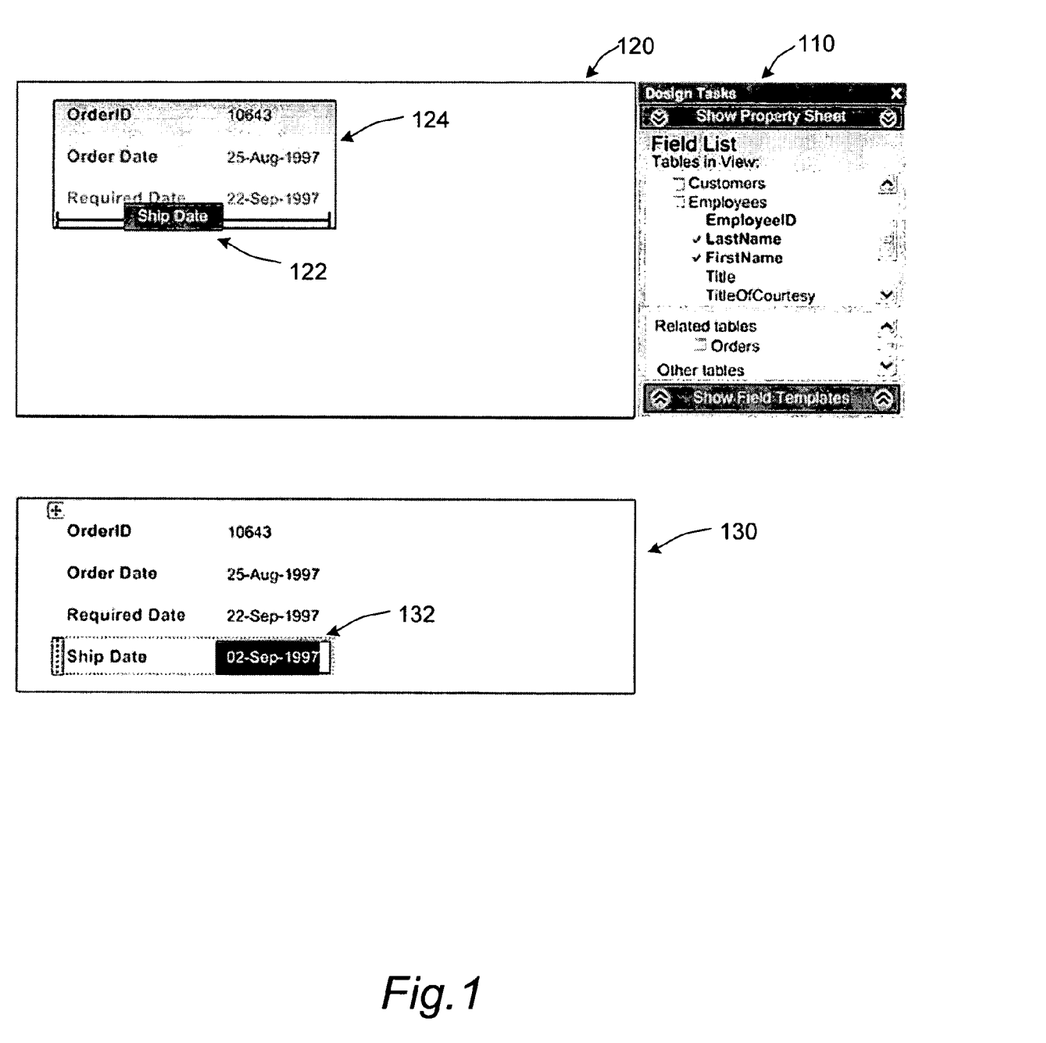
FIG. 1 illustrates adding a field to a stacked layout in a browse mode designer.

FIG. 1 illustrates adding a field to a stacked layout (as used in Microsoft Office® Access®, for example) in a browse mode designer. In one embodiment, the browse mode designer is implemented on a computer system, such as a computer that is networked to a database. Task pane 110 is used to show, for example, database fields that can be used to modify view 120. Task pane 110 displays available fields that a user can select (by dragging over and dropping onto view 120, for example) in order to create a desired view.

As shown in view 120, dragging field 122 from the field list of task pane 110 causes an insertion line to be displayed at a potential drop point within a shaded region comprising stacked layout 124. Releasing field 122 causes new field 132 to be shown in view 130.

Figure 2:
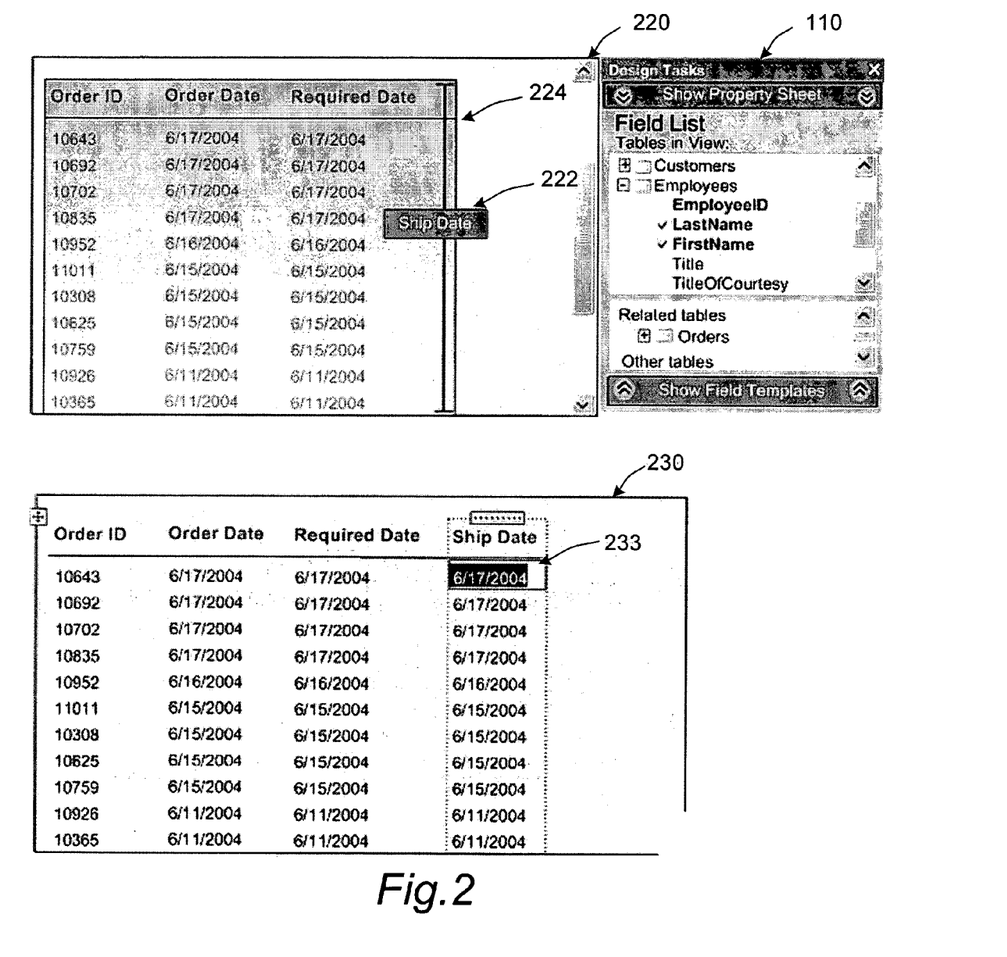
FIG. 2 illustrates adding a field to a tabular layout in a browse mode designer.

FIG. 2 illustrates adding a field to a tabular layout (as used in Microsoft Office® Access®, for example) in a browse mode designer. As shown in view 220, dragging field 222 from the field list of task pane 110 causes a shaded region to be formed that comprises table 224. Releasing field 222 causes new column 233 to be shown in view 230.

Figure 3:
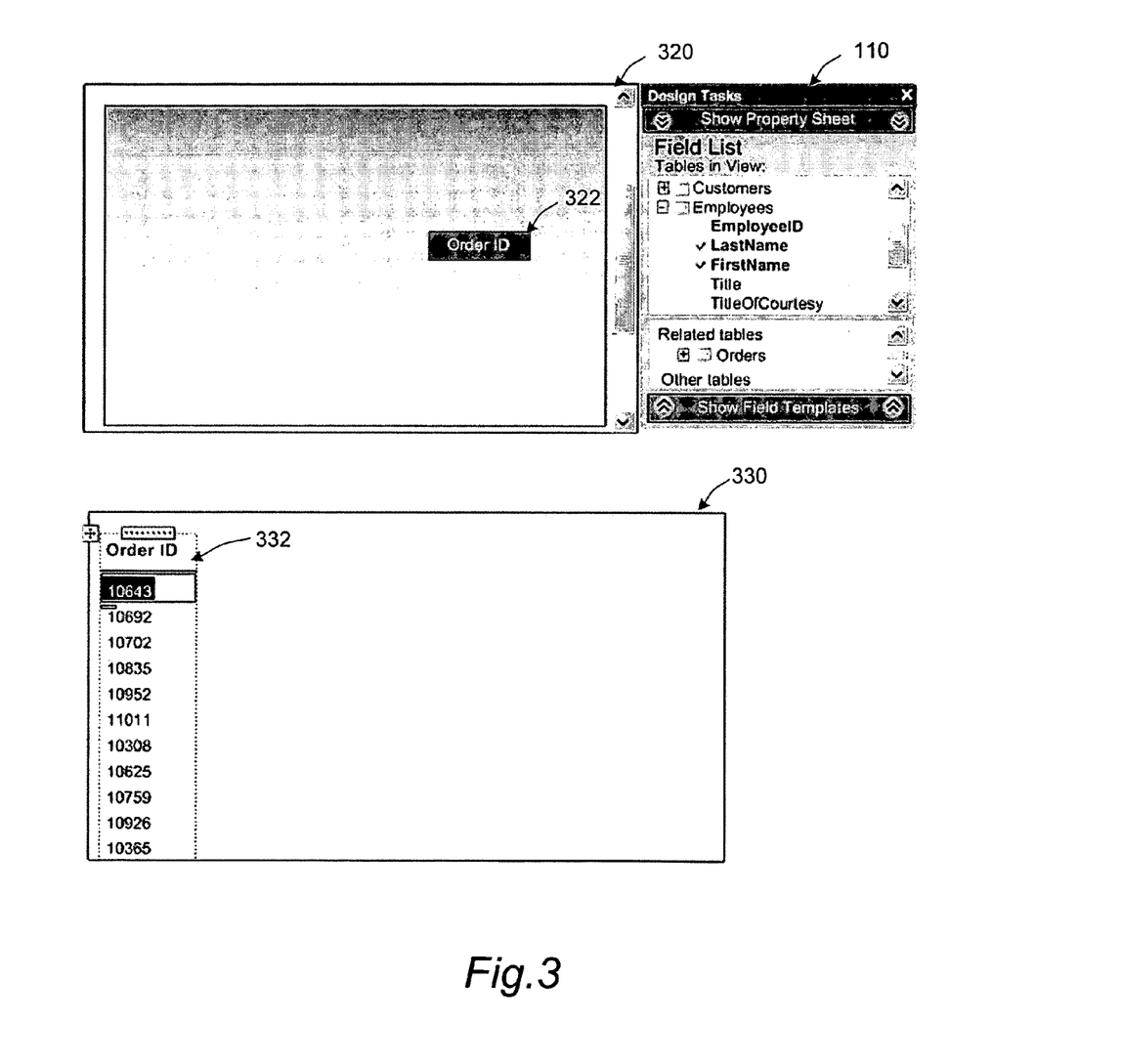
FIG. 3 illustrates adding a field to an empty view in a browse mode designer.

FIG. 3 illustrates adding a field to an empty view in a browse mode designer. As shown in view 320, dragging field 322 from the field list of task pane 110 causes a shaded region to be formed in view 320. Releasing field 322 causes new column 332 to be shown in view 330.

Figure 4:
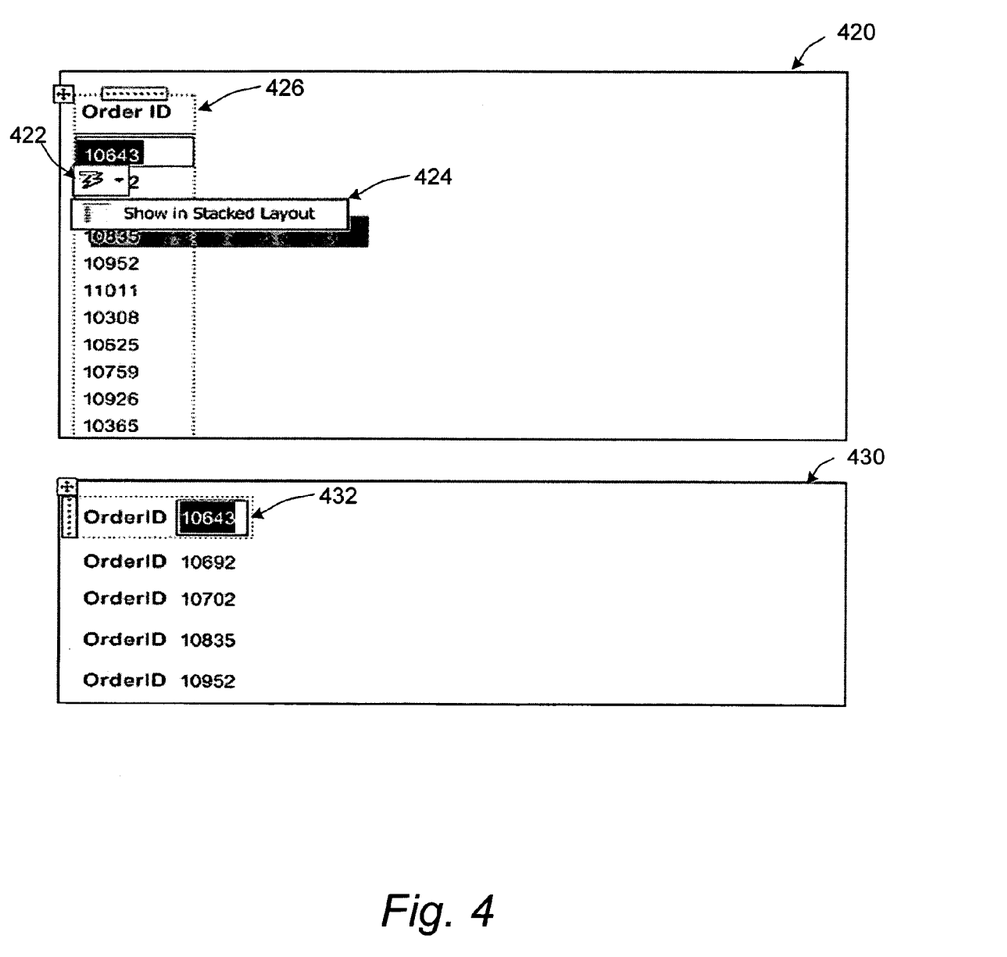
FIG. 4 illustrates choosing a non-default layout when adding a field to an empty view in a browse mode designer.

FIG. 4 illustrates choosing a non-default layout when adding a field to an empty view in a browse mode designer. As shown in view 420, activating control 422 causes an alternate selection 424 to be shown in view 420. (Control 422 can be displayed by, for example, hovering the cursor over field 426.)

Alternate selection 424 displays a layout that is typically an alternative to the selected field. For example, field 426 is in a tabular layout, and alternate selection 424 displays the text "Show in Stacked Layout." Clicking alternate selection 424 causes the selected field to be reordered into a stacked layout 432 as shown in view 430. In one embodiment, the browse mode designer implements commands in accordance with the Table 1, below.

TABLE 1

| Icon | Text (and Accessible Value) | When to show |
|------|---|---|
| | Show in Stacked Layout | Until first design change after automatically creating a new Tabular Layout. |
| | Show in Tabular Layout | Until first design change after automatically creating a new Stacked Layout |

With respect to viewing data from related data sources, the field list (in the task pane) allows users to add fields to their views that are not currently a part of a query to which the view is bound. Adding a field from a related data source typically adds the field into the query and adds a control to the view simultaneously.

Figure 5:
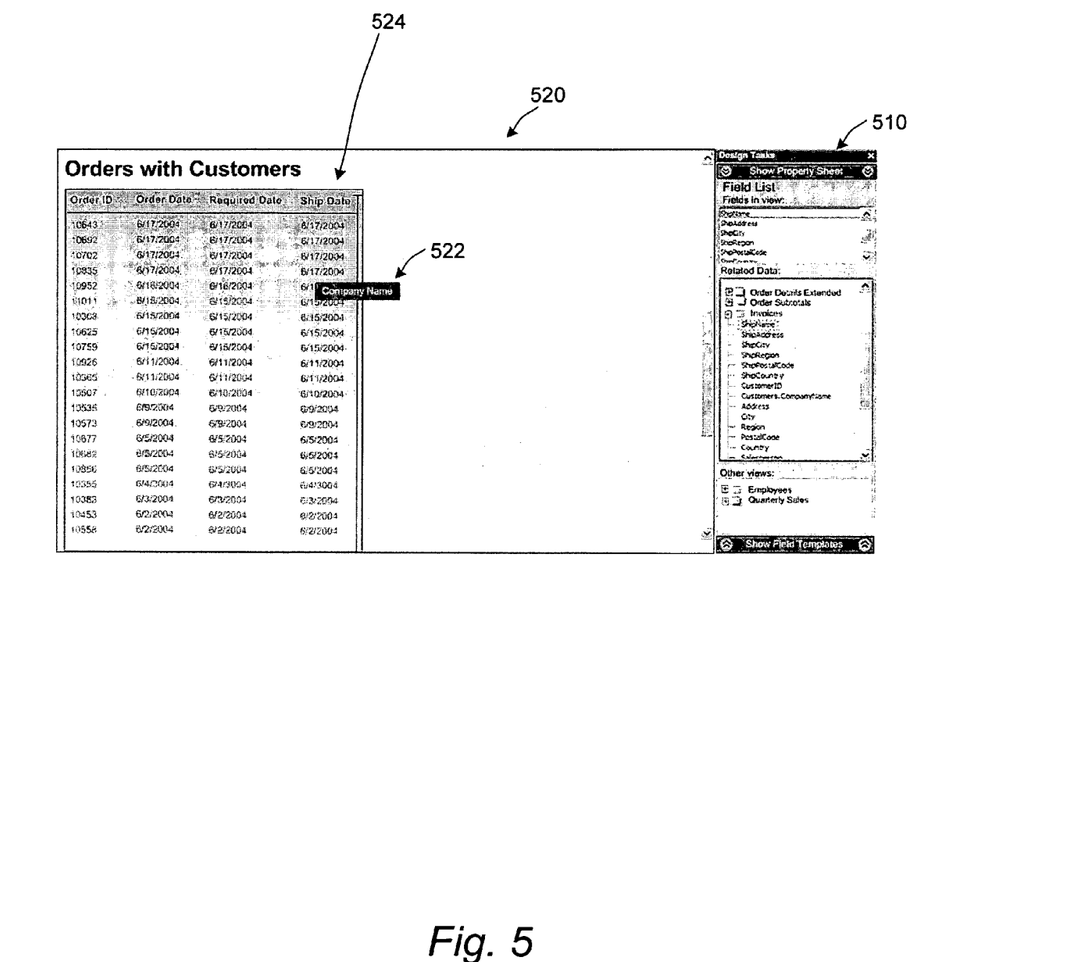
FIG. 5 illustrates initiating an example JOIN operation in a report organized as "Orders with Customers;"

As shown in Table 2 below, there are at least six possible scenarios for adding fields from related data sources into the view. In the Table, "1" refers to a form or report that can already display data from a table on the "one" side of a data relationship, while "∞" refers to a form or report that can already display data from a table on the "many" side of a data relationship. A data relationship is information stored by the database about the data in two or more tables. It may indicate, for instance, that for each record in one table, a number of records in another table share the same data for a given set of fields. In FIG. 5, the Customers table has a one-to-many relationship with the Orders table, such that for each record in Customers, which is determined by having a unique value in the ID field, there can be zero, one or many records in Orders where the field CustomerID equals the value of the ID field in the Customers record. For each of these scenarios, a different action is typically performed. FIGS. 5-10 below illustrate the actions in Table 2 based on an example database, in which "Orders" has a many-to-one relationship to "Customers."

TABLE 2

| | Drag from 1 -> ∞ | Drag from ∞ -> 1 |
|---|---|---|
| Single Item Form | JOIN | JOIN |
| Continuous Form | JOIN | Sub-Datasheet (converts to detail form) |
| Report | Grouping | JOIN |

Table 3 and Table 4 display alternate formatting options, which appear in the browse mode designer after a field from a related data source has been added to the view. The formatting options are typically only made available until the next design change.

TABLE 3

| | Drag from 1 -> ∞ | Drag from ∞ -> 1 |
|---|---|---|
| Single Item Form | JOIN | JOIN |
| Continuous Form | JOIN | Sub-Datasheet (converts to detail form) |
| Report | Grouping | JOIN |

TABLE 4

| Operation | Text (and Accessible Value) |
|---|---|
| JOIN (Forms) | Change to Text |
| Sub-Datasheet | Change to Datasheet |
| JOIN (Reports) | Do not Group |
| Grouping | Group By <Field Name> |

FIG. 5 illustrates initiating an example JOIN operation in a report organized as "Orders with Customers." As shown in view 520, dragging field 522 from the field list of task pane 510 causes a shaded region to be formed that comprises table 524. Releasing field 522 initiates a JOIN operation, which is illustrated in FIG. 6.

Figure 6:
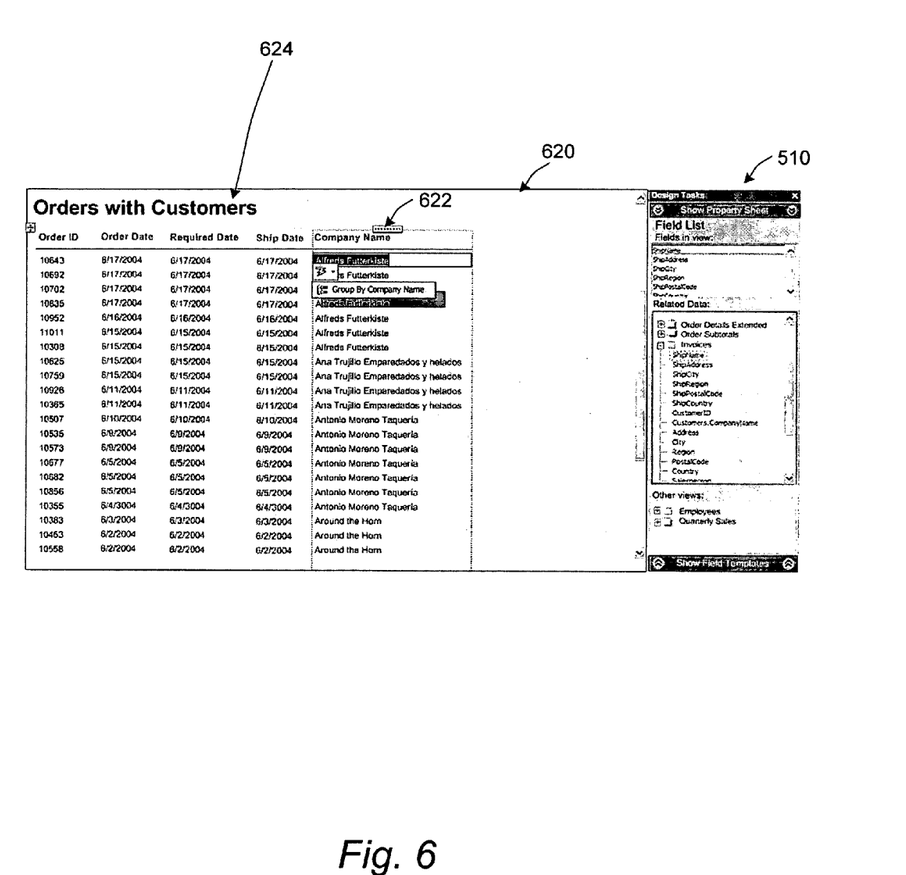
FIG. 6 illustrates the result of an example JOIN operation in a report organized as "Orders with Customers;"

FIG. 6 illustrates the result of an example JOIN operation in a report organized as "Orders with Customers." As shown in view 620, releasing field 522 (dragged from task pane 510) causes a JOIN operation, which adds the field 622 ("Company Name") to table 624. Field 622 causes table 624 to show the data that has relationships with field 622 to be displayed.

Figure 7:
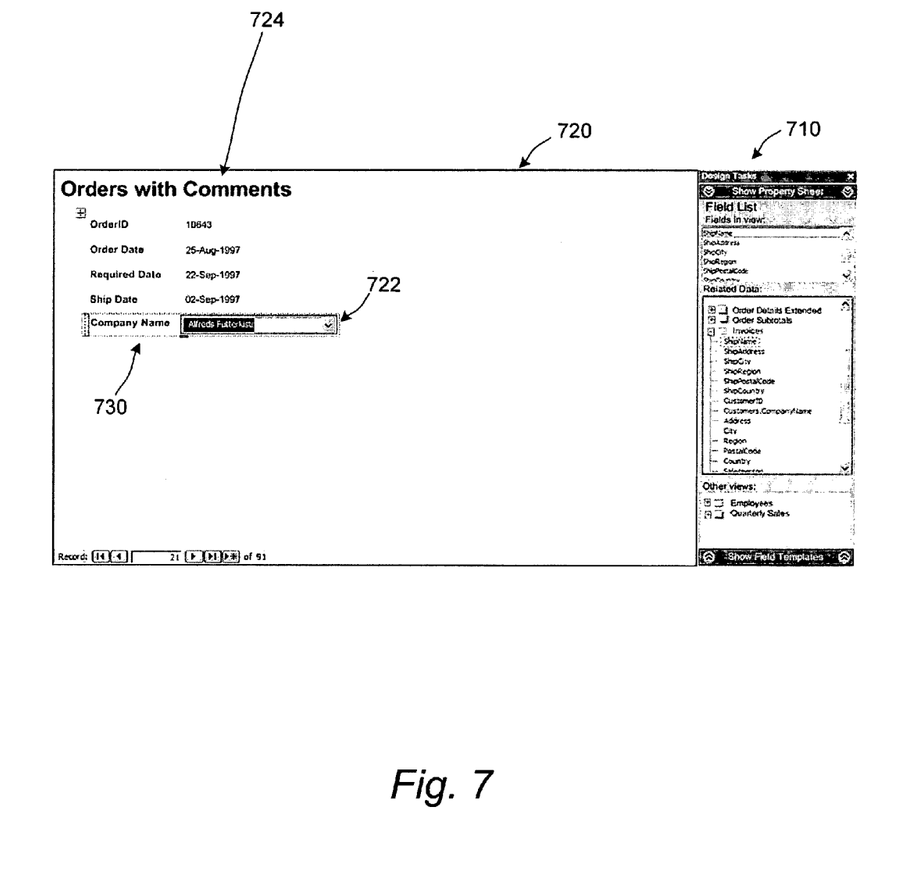
FIG. 7 illustrates creating a lookup field in a report organized as "Orders with Comments;"

FIG. 7 illustrates creating a lookup field in a report organized as "Orders with Comments." As shown in view 720, releasing field 730 (dragged from task pane 710) causes a JOIN operation, which adds the field 722 ("Company Name") to stacked layout 724. When a lookup field is created, a combo box is typically bound to the foreign key which relates the "many" table to the "one" table. The ControlSource for combobox 730 is typically a foreign key in the "many" table that relates the "many" table to the "one" table. The RowSource for combobox 730 is a query which is bound to the primary key in the "one" table and the field that was dragged in and released.

The display field for the lookup is the field which was dragged in (the foreign key field is hidden). Subsequent fields that are added to the view after a lookup has been created become JOINed in to the current view. For each of the subsequent fields a read-only textbox is created as in a JOIN operation. Because one field is used as a lookup field for each relationship, a newly added field to the lookup field causes the current lookup field to become a JOINed field.

Figure 8:
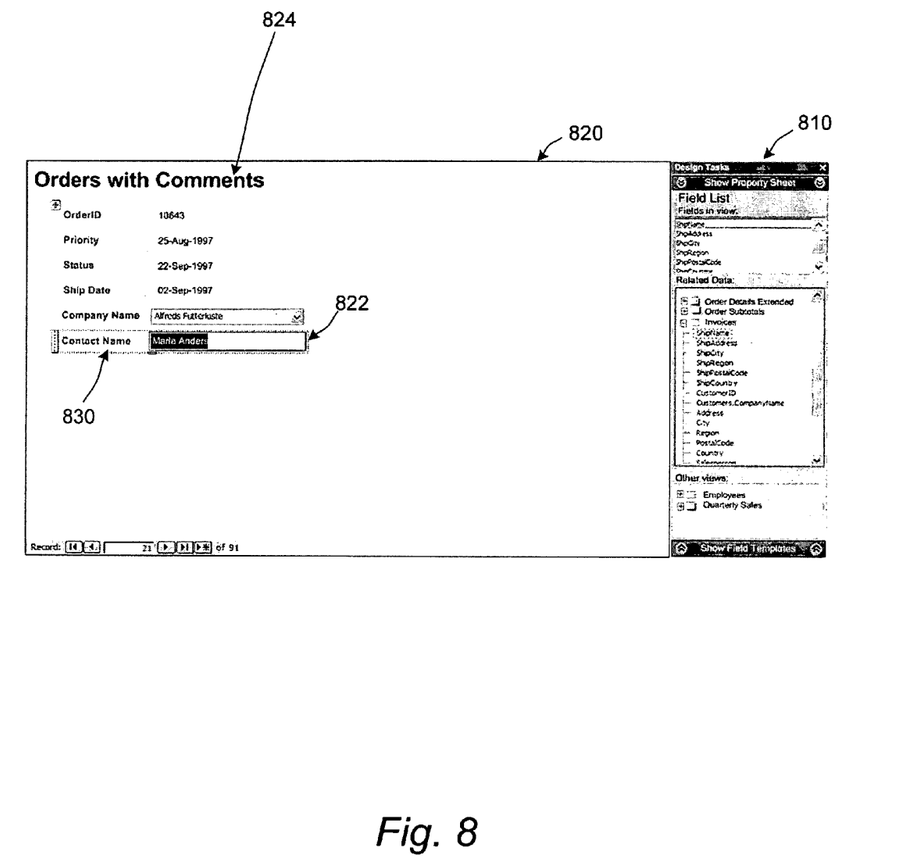
FIG. 8 illustrates adding a new field from the same table organized as "Orders with Comments;"

FIG. 8 illustrates adding a new field from the same table organized as "Orders with Comments." As shown in view 820, releasing field 830 (dragged from task pane 810) causes a JOIN operation, which adds the field 822 ("Contact Name") to stacked layout 824.

Figure 9:
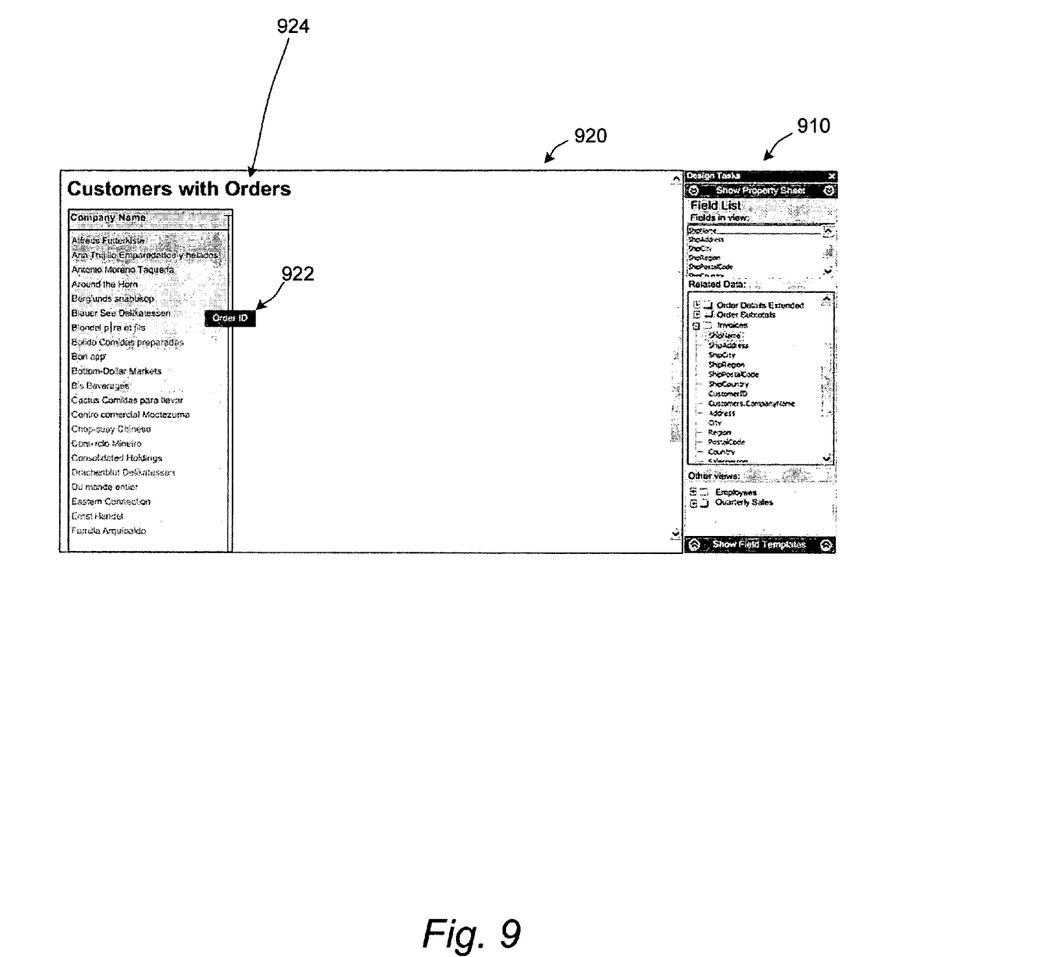
FIG. 9 illustrates initiating an example grouping operation in a report organized as "Customers with Orders;"

FIG. 9 illustrates initiating an example grouping operation in a report organized as "Customers with Orders." As shown in view 920, dragging field 922 from the field list of task pane 910 causes a shaded region to be formed that comprises table 924. In one embodiment, releasing field 922 initiates a grouping operation, which is illustrated in FIG. 10.

Figure 10:
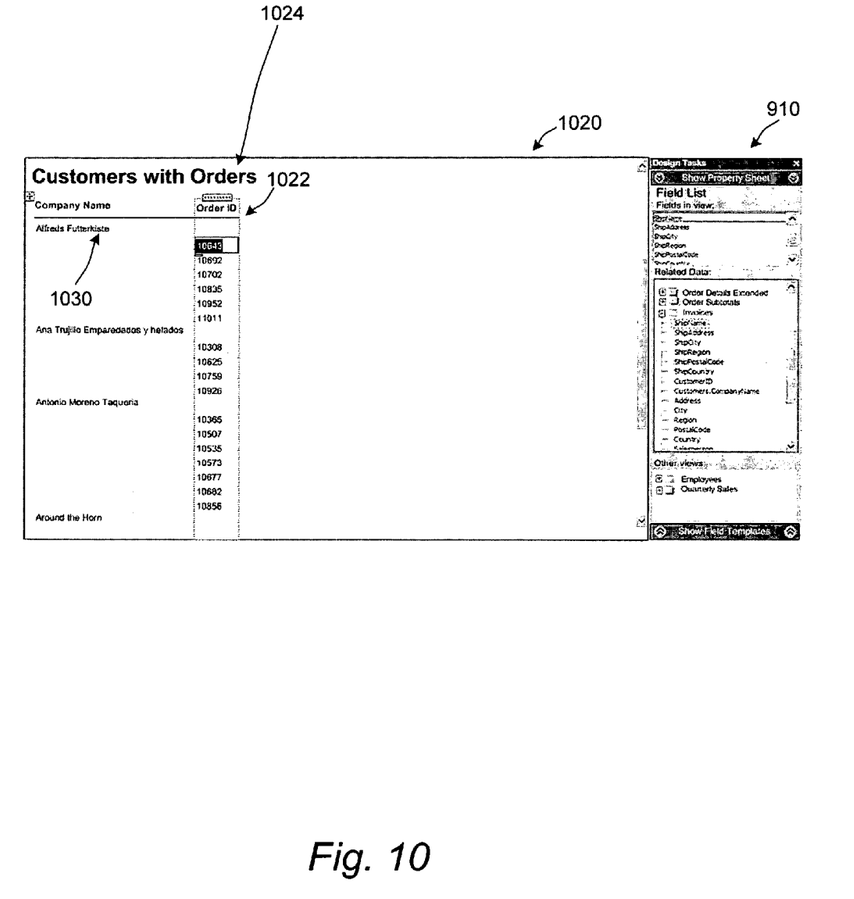
FIG. 10 illustrates results of an example grouping operation in a report organized as "Customers with Orders;"

FIG. 10 illustrates results of an example grouping operation in a report organized as "Customers with Orders." As shown in view 1020, releasing field 1022 (dragged from task pane 910) causes a grouping operation, which causes repeated instances of field 1030 ("Company Name") to be stated only once in table 1024. However, each instance of field 1022 is displayed in table 1024 to show the relationship each instance has with field 1030.

Figure 11:
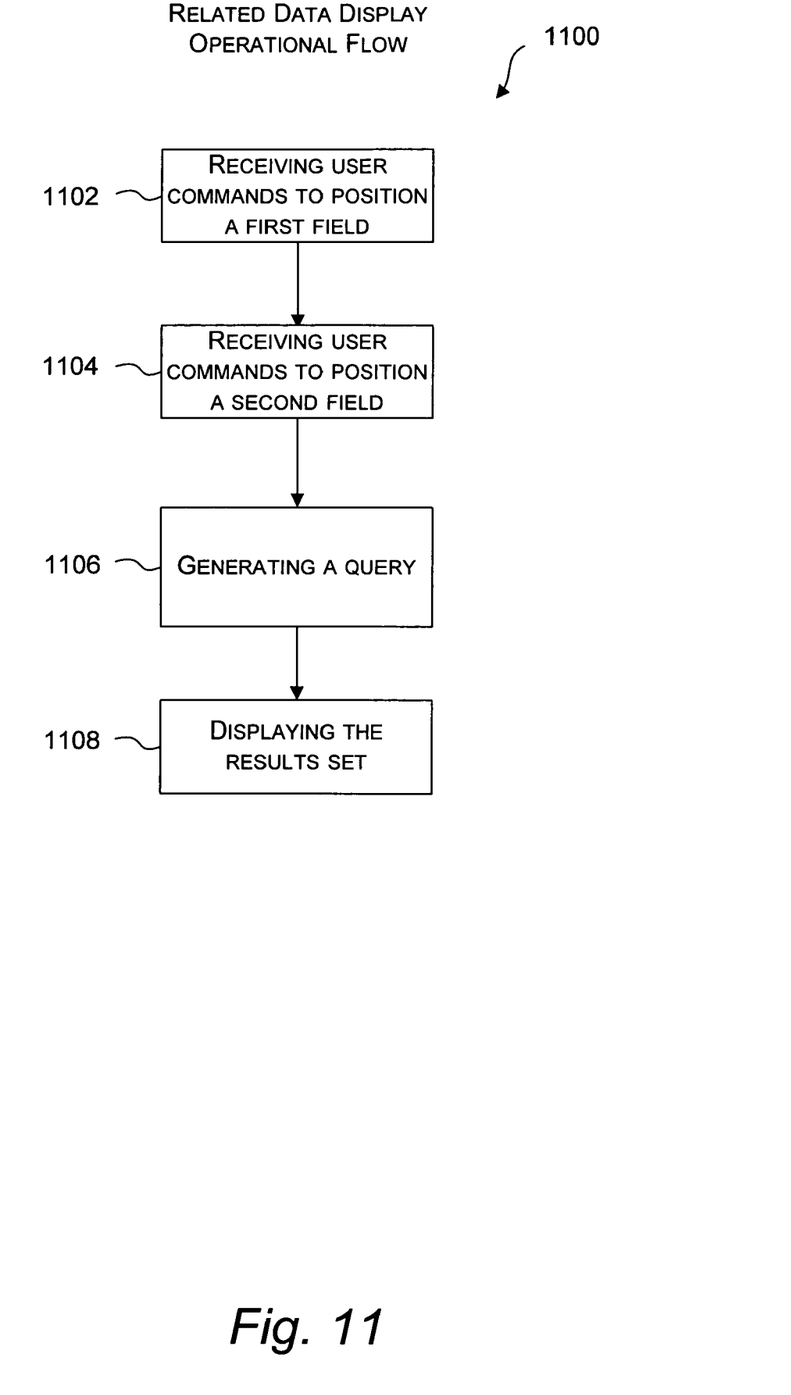
FIG. 11 illustrates an operational flow 1100 for displaying related data.
Figure 12:
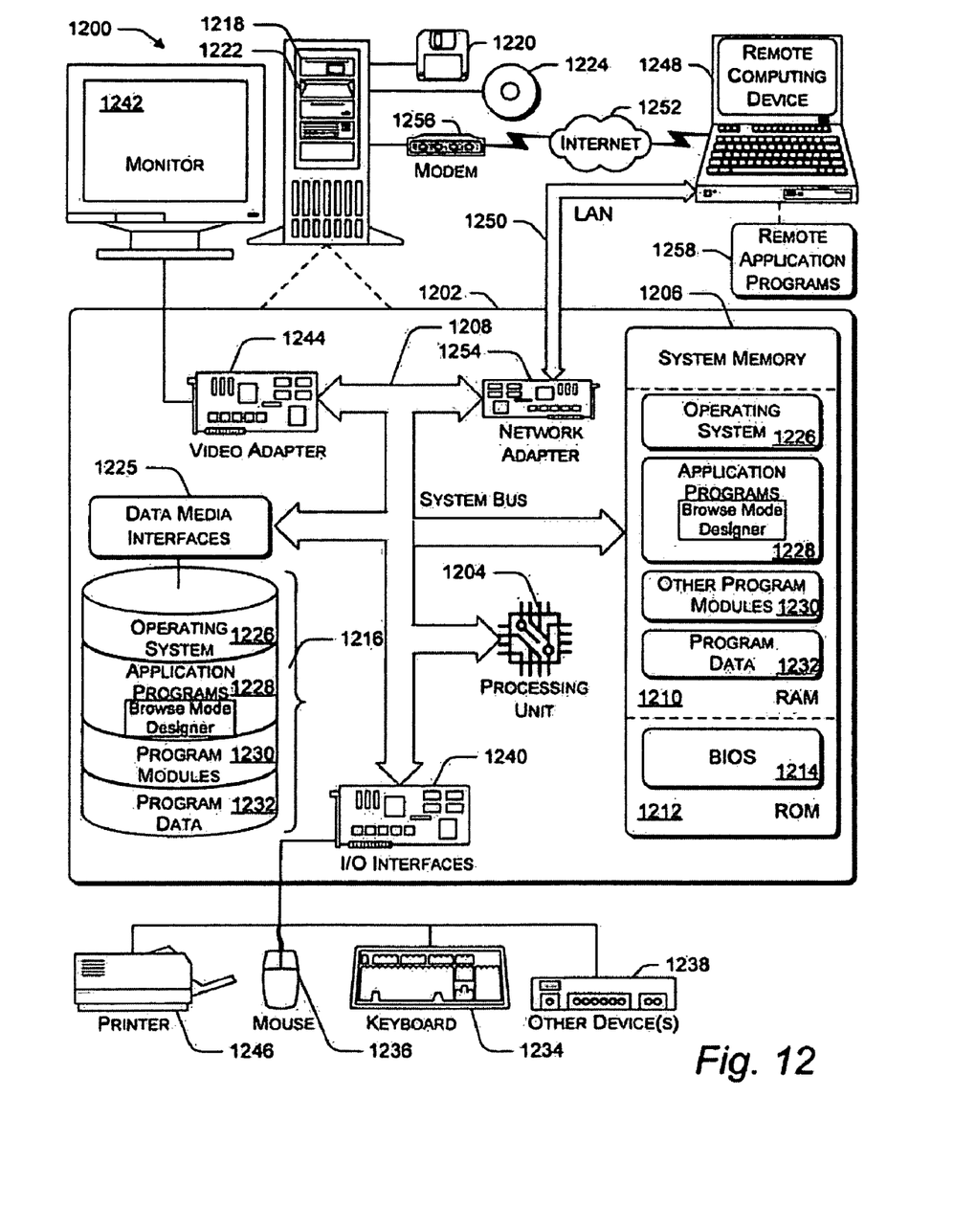
FIG. 12 illustrates a general computer environment 1200, which can be used to implement the techniques described herein.

FIG. 11 illustrates an operational flow 1100 for displaying related data. Operational flow 1100 may be performed in any suitable computing environment. For example, operational flow 1100 may be executed by an application such as user application programs 1228 (FIG. 12, below) to perform the schema editing. Therefore, the description of operational flow 1100 may refer to at least one of the components of FIG. 12. However, any such reference to components of FIG. 12 is for descriptive purposes only, and it is to be understood that the implementations of FIG. 12 are a non-limiting environment for operational flow 1100.

At operation 1102, user commands are received to position a first field on a display surface. In various embodiments, the first field can be arranged in schemas, structures, user-defined lists and the like. A list of fields can be arranged in a tree structure that is expandable and collapsible in accordance with the wishes of a user. The user can use the list of fields as a source from which to choose fields for the view surface.

At operation 1104, user commands are received to position a second field on the display surface. When multiple fields are displayed, a "context" exists between fields that comprises extant logical relationships. When an additional field is added (which provides additional intended context), the extant logical relationships are used to decide how to format the visual output to display data in a useful and efficient manner.

For example, a graphical user interface is provided to visually depict, for example, an area comprising valid insertion points for the second field position. In this example, data can be seen, but not edited, copied, or entered. In another example, commands can be received for entering the data for the first and second fields.

At operation 1106, a query is generated to produce a results set from the first and second fields in accordance with the determined logical relationship. In various embodiments, the results set is the result of the determined logical relationship, such as a logical join. In an embodiment, the user is provided controls for changing a default determined logical relationship.

At operation 1108, the results set is displayed in accordance with the first field position and the second field position. The editor recognizes that the fields are displayed as part of a visual structure, and adds new fields to the structure in a visually cohesive fashion. For example, the results set can be displayed as a table or a stacked layout. The user interface is configured to receive commands from the user to use fields from a list for editing (or otherwise creating, modifying, repositioning, and the like) a view. The user can also group repeated items in a field, such as when encountered in a one-to-many or many-to-one relationship between the first and second fields. The results set display can, for example, be automatically adjusted to avoid overlapping of fields in response to the width or height of data items of a field.

FIG. 12 illustrates a general computer environment 1200, which can be used to implement the techniques described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the example computer environment 1200.

Computer environment 1200 includes a general-purpose computing device in the form of a computer 1202. The components of computer 1202 can include, but are not limited to, one or more processors or processing units 1204, system memory 1206, and system bus 1208 that couples various system components including processor 1204 to system memory 1206.

System bus 1208 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus, also known as a Mezzanine bus, a PCI Express bus (and the like), a Universal Serial Bus (USB), a Secure Digital (SD) bus, and/or an IEEE 1394, i.e., FireWire, bus.

Computer 1202 may include a variety of computer readable media. Such media can be any available media that is accessible by computer 1202 and may be either volatile or non-volatile media, removable or non-removable media.

System memory 1206 includes computer-readable media in the form of volatile memory, such as random access memory (RAM) 1210; and/or non-volatile memory, such as read only memory (ROM) 1212 or flash RAM. Basic input/output system (BIOS) 1214, containing the basic routines that help to transfer information between elements within computer 1202, such as during start-up, is stored in ROM 1212 or flash RAM. RAM 1210 typically contains data and/or program modules that are immediately accessible to and/or presently operated on by processing unit 1204.

Computer 1202 may also include other removable/non-removable, volatile/non-volatile computer storage media. By way of example, FIG. 12 illustrates hard disk drive 1216 for reading from and writing to a non-removable, non-volatile magnetic media (not shown), magnetic disk drive 1218 for reading from and writing to removable, non-volatile magnetic disk 1220 (e.g., a "floppy disk"), and optical disk drive 1222 for reading from and/or writing to a removable, non-volatile optical disk 1224 such as a CD-ROM, DVD-ROM, or other optical media. Hard disk drive 1216, magnetic disk drive 1218, and optical disk drive 1222 are each connected to system bus 1208 by one or more data media interfaces 1225. Alternatively, hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, removable magnetic disk 1220, and removable optical disk 1224, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1216, magnetic disk 1220, optical disk 1224, ROM 1212, and/or RAM 1210, including by way of example, operating system 1226, one or more application programs 1228 (which can include schema editing as described above), other program modules 1230, and program data 1232. Each of such operating system 1226, one or more application programs 1228, other program modules 1230, and program data 1232 (or some combination thereof) may implement all or part of the resident components that support the distributed file system.

A user can enter commands and information into computer 1202 via input devices such as keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to processing unit 1204 via input/output interfaces 1240 that are coupled to system bus 1208, but may be connected by other interface and bus structures, such as a parallel port, game port, or a universal serial bus (USB).

Monitor 1242 or other type of display device can also be connected to the system bus 1208 via an interface, such as video adapter 1244. In addition to monitor 1242, other output peripheral devices can include components such as speakers (not shown) and printer 1246 which can be connected to computer 1202 via I/O interfaces 1240.

Computer 1202 can operate in a networked environment using logical connections to one or more remote computers, such as remote computing device 1248. By way of example, remote computing device 1248 can be a PC, portable computer, a server, a router, a network computer, a peer device or other common network node, and the like. Remote computing device 1248 is illustrated as a portable computer that can include many or all of the elements and features described herein relative to computer 1202. Alternatively, computer 1202 can operate in a non-networked environment as well.

Logical connections between computer 1202 and remote computer 1248 are depicted as a local area network (LAN) 1250 and a general wide area network (WAN) 1252. Such networking environments are commonplace in offices, enterprise-wide computer networks, intranets, and the Internet.

When implemented in a LAN networking environment, computer 1202 is connected to local area network 1250 via network interface or adapter 1254. When implemented in a WAN networking environment, computer 1202 typically includes modem 1256 or other means for establishing communications over wide area network 1252. Modem 1256, which can be internal or external to computer 1202, can be connected to system bus 1208 via I/O interfaces 1240 or other appropriate mechanisms. It is to be appreciated that the illustrated network connections are examples and that other means of establishing at least one communication link between computers 1202 and 1248 can be employed.

In a networked environment, such as that illustrated with computing environment 1200, program modules depicted relative to computer 1202, or portions thereof, may be stored in a remote memory storage device. By way of example, remote application programs 1258 reside on a memory device of remote computer 1248. For purposes of illustration, applications or programs and other executable program components such as the operating system are illustrated herein as discrete blocks, although it is recognized that such programs and components reside at various times in different storage components of computing device 1202, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for dynamically generating a database report during a report building process without preconfiguring a layout of the database report, the method comprising:

simultaneously displaying a task pane and a report pane, wherein the task pane includes a display of a plurality of data field identifiers that identify categories of values in a remote database server, wherein the remote database server maintains the values of the plurality of database fields, wherein the report pane includes a display of a report that has a display of a first set of values of a first data field;

without preconfiguring a layout of the database report and while simultaneously displaying the task pane and the report in the report pane:

receiving a selection of a second data field identifier from the task pane, receiving a selection of an insertion point into the report of the report pane, in response to the selection of the insertion point, automatically modifying the report, wherein automatically modifying the report includes:

automatically generating and displaying a category in the report that is indicated by the second data field at the insertion point, automatically querying the remote database to obtain values identified by the second data field identifier that are implicated by the first set of values of the first data field, wherein the remote database returns the values identified by the second data field identifier that are implicated by the first set of values of the first data field, and automatically displaying a population of the second set of values at the insertion point in the report in relation to the first set of values of the first data field.

2. The computer-implemented method of claim 1, wherein automatically modifying the report further includes automatically changing a width of a column associated with the first data field and automatically change a width of a column associated with the second data field.

3. The computer-implemented method of claim 1, wherein automatically modifying the report further includes automatically changing the width of a row associated with the first data field and automatically change the width of a row associated with the second data field.

4. The computer-implemented method of claim 1, wherein automatically modifying the report further includes generating a selection field bound by a foreign key.

5. The computer-implemented method of claim 1, wherein automatically modifying the report further includes causing a grouping operation, wherein the grouping operation causes content of the second set of values to be grouped according to content of the first set of values.

6. The computer-implemented method of claim 1, further comprising providing a selector for changing the report between a tabular layout view and a stack layout view.

7. The computer-implemented method of claim 1, wherein the selection of the insertion point includes dragging the second data field identifier from the task pane to the report of the report pane, wherein dropping the second data field identifier automatically causes the display of the category in the report that is indicated by the second data field and automatically causes a querying the remote database to obtain values identified by the second data field identifier that are implicated by the first set of values of the first data field, wherein the remote database automatically returns the values identified by the second data field identifier that are implicated by the first set of values of the first data field.

8. A computer-readable storage medium having computer executable instructions for dynamically generating a database report during a report building process, the instructions comprising:

providing a report building user interface, wherein the report building user interface includes a task pane and a report pane, wherein the task pane includes a plurality of database field identifiers that are configured to query a remote database server according to a selected database field upon insertion of the selected database field identifier into the report pane, wherein the report pane includes a dynamically modifiable report that is reconfigured upon receiving the insertion of the selected database field identifier from the task pane;

without preconfiguring a layout of the database report and while simultaneously displaying the task pane and the report in the report pane:

receiving a selection of a database field identifier from the task pane, receiving, in the report of the report pane, an insertion point for the selected database field, in response to receiving the insertion point, automatically reconfiguring the report, wherein automatically reconfiguring the report includes:

generating a category associated with the selected database field identifier in the report at the insertion point, querying the remote database server with the selected database field identifier to obtain data in the remote database server associated with the selected database field, and populating the report with the data in the database at the insertion point associated with the generated category.

9. The computer-readable storage medium of claim 8, wherein automatically reconfiguring the report further includes automatically changing a width of a column associated with the category.

10. The computer-readable storage medium of claim 8, wherein automatically reconfiguring the report further includes automatically changing the width of a row associated with the category.

11. The computer-readable storage medium of claim 8, wherein automatically reconfiguring the report further includes generating a selection field bound by a foreign key.

12. The computer-readable storage medium of claim 8, wherein automatically reconfiguring the report further includes causing a grouping operation, wherein the grouping operation causes the obtained data to be grouped according to content of another data set.

13. The computer-readable storage medium of claim 8, further comprising providing a selector for changing the report between a tabular layout view and a stack layout view.

14. The computer-readable storage medium of claim 8, wherein the selection of the insertion point includes dragging the selected data field from the task pane to the report of the report pane.

15. A system for dynamically generating a database report during a report building process, the method comprising:

a processor; and a memory having computer executable instructions stored thereon, wherein the computer executable instructions are configured for:

providing a task pane and a report pane, wherein the task pane includes a display of a plurality of data field identifiers that identify categories of values in a remote database server, wherein the remote database server maintains the values of the plurality of database fields, wherein the report pane includes a display of a report that has a display of a first set of values of a first data field;

without preconfiguring a layout of the database report and while simultaneously displaying the task pane and the report in the report pane:

receiving a selection of a second data field identifier from the task pane, receiving a selection of an insertion point into the report of the report pane, in response to the selection of the insertion point, automatically modifying the report, wherein automatically modifying the report includes:

automatically generating and displaying a category in the report that is indicated by the second data field at the insertion point, automatically querying the remote database to obtain values identified by the second data field identifier that are implicated by the first set of values of the first data field, wherein the remote database returns the values identified by the second data field identifier that are implicated by the first set of values of the first data field, and automatically displaying a population of the second set of values at the insertion point in the report in relation to the first set of values of the first data field.

16. The system of claim 15, wherein automatically modifying the report further includes automatically changing a width of a column associated with the first data field and automatically change a width of a column associated with the second data field.

17. The system of claim 15, wherein automatically modifying the report further includes automatically changing the width of a row associated with the first data field and automatically change the width of a row associated with the second data field.

18. The system of claim 15, wherein automatically modifying the report further includes generating a selection field bound by a foreign key.

19. The system of claim 15, wherein automatically modifying the report further includes causing a grouping operation, wherein the grouping operation causes content of the second set of values to be grouped according to content of the first set of values.

20. The system of claim 15, further comprising providing a selector for changing the report between a tabular layout view and a stack layout view.

* * * * *